Sept. 20, 1966　　　　H. SEIDEN　　　　3,274,464
TEMPERATURE COMPENSATING TRIMMER CAPACITOR
Filed Nov. 3, 1964
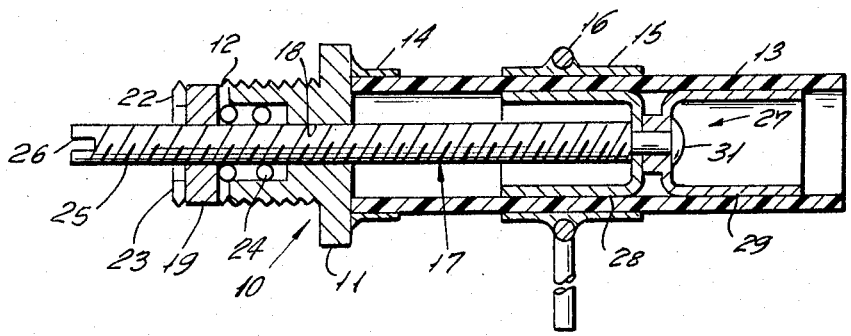
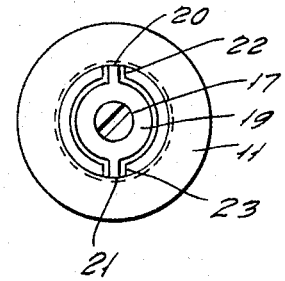
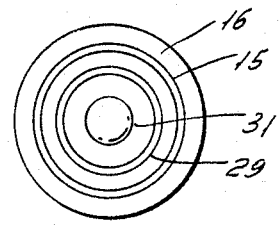
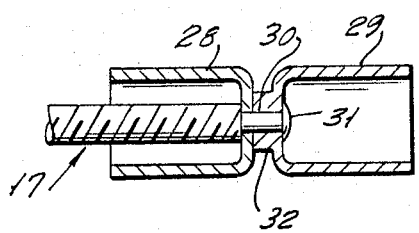
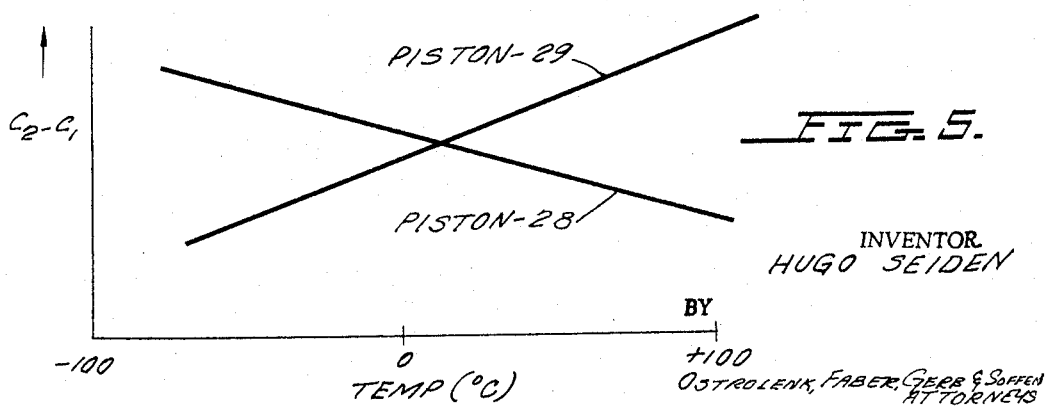
INVENTOR.
HUGO SEIDEN
BY
OSTROLENK, FABER, GERB & SOFFEN
ATTORNEYS

United States Patent Office 3,274,464
Patented Sept. 20, 1966

3,274,464
TEMPERATURE COMPENSATING TRIMMER
CAPACITOR
Hugo Seiden, Brooklyn, N.Y., assignor to JFD Electronics
Corporation, Brooklyn, N.Y., a corporation of New
York
Filed Nov. 3, 1964, Ser. No. 408,483
5 Claims. (Cl. 317—248)

This invention relates to a novel trimmer capacitor, and more specifically relates to a trimmer capacitor having a controllable temperature coefficient of capacitance.

Trimmer capacitors are devices well know to the art wherein an adjustable piston serving as one electrode of the device moves within a dielectric cylinder and with respect to a second eletrode secured to the dielectric cylinder. The axial adjustment of the piston position then operates to adjust the capacitance of the device.

It is well known that such devices which are used where extremely accurate capacitance adjustment is required are sensitive to temperature, and the capacitance between the electrodes will vary as a function of temperature. Some of the reasons for this capacitance change as a function of temperature is that the dielectric constant of the dielectric cylinder varies as a function of temperature; changes in the dimension of the parts with temperature and therefore changes in the gap between the piston and the interior of the cylinder; and, to some extent, the length of the adjustment member carrying the piston will change, thereby minutely varying the piston position.

In the past, many efforts have been made to overcome this problem. In general, these efforts used bi-metallic structures for one or both of the cooperating electrodes so that as the dimensions of the parts change with temperature, the change in dimension of one of the bi-metallic sections will compensate a change in the other of the bi-metallic sections. Moreover, in these devices, an attempt is made to provide as wide as possible adjustment of the temperature coefficient of capacitance.

The present invention provides a novel piston capacitor structure having an extremely inexpensive construction which can provide a substantially completely temperature compensated device so that there will be substantially no change in capacitance as a function of temperature, or alternatively, to force the device to change its capacitance as a predetermined function of temperature whereby the device can be used to compensate the temperature change of other devices of a circuit containing the trimmer capacitor.

Accordingly, a primary object of this invention is to provide a novel trimmer capacitor having an adjusted temperature coefficient of capacitance between positive and negative value.

Another object of this invention is to provide a novel temperature compensated trimmer capacitor which is mechanically simple and inexpensive to manufacture.

Yet another object of this invention is to provide a novel improved trimmer capacitor wherein the effect of a radial and/or axial dimension change of the adjustment member is compensated.

These and other objects of this invention will become apparent from the following description when taken in connection with the drawings in which:

FIGURE 1 is a cross-sectional view of a trimmer capacitor manufactured in accordance with the present invention.

FIGURE 2 is a side plan view of the capacitor of FIGURE 1 as seen from the left-hand side of FIGURE 1.

FIGURE 3 is a side plan view of FIGURE 1 as seen from the right-hand side of FIGURE 1.

FIGURE 4 is an enlarged cross-sectional view of the novel piston construction used in FIGURES 1, 2, and 3.

FIGURE 5 shows the relation between capacitance and temperature change for the device of FIGURE 1.

Referring now to the figures, I have illustrated therein what is for the most part a standard type of trimmer capacitor structure which includes a main support bushing 10 having an extending flange 11, and a mounting thread 12. Thus, the device can be mounted by inserting the threaded portion 12 of bushing 10 into an opening in a support base which receives the mounting flange 11 in a flush manner. Thereafter, a nut (not shown) is threaded on the thread 12 to secure the device in place. It should be noted, however, that the present invention is not limited to flange-type trimmer capacitors, but is generally applicable to any type of trimmer capacitor.

A dielectric cylinder 13 which could, for example, be of glass, is then provided with a suitably metallized band 14 at its left-hand end which is soldered to the right-hand face of flange 11 so that the dielectric cylinder 13 is carried from bushing 10. A second metallized portion 15 is secured at a centrally located region along glass tube 13 and received a lead 16 as by soldering where the lead 16 forms a first terminal of the device, while the bushing 10 forms the second terminal of the device.

An adjustment screw, schematically illustrated as screw 17, is then threadably received by the internally threaded portion 18 of bushing 10. A torque nut 19, which is best shown in FIGURES 1 and 2, then has two extending ears 20 and 21 which are received by slots 22 and 23 of bushing 10. A compression spring 24 is then captured between torque nut 22 and the interior wall of bushing 10. Note that screw 17 is threaded through an internally threaded portion 25 of the torque nut 19.

The left-hand end of adjustment screw 17 is then provided with a suitable tool-receiving slot 26, while the right-hand end of adjustment screw 17 is mechanically connected to the novel piston assembly 27 of the invention. Note that the piston described to this point and with the exception of piston assembly 27 is of the standard type used in the trimmer capacitor field. In general, however, the prior art type piston connected to the right-hand end of screw 17 will be of a single piston variety or of a complex bi-metallic form.

In accordance with the present invention, the piston assembly 27 is comprised of two oppositely directed relatively standard piston forms 28 and 29. Each of piston forms 28 and 29 has central openings therein which, as best shown in FIGURE 4, receive an extending necked-down portion 30 of adjustment screw 17 which is peened over to form button 31 on the interior of piston form 29.

Moreover, and in accordance with the invention, the piston form 29 is provided with an extending pad 32 to provide predetermined spacing between the piston forms 28 and 29 and limits the surface contact between these pistons. This decreases shear stress between the two pistons occasioned by differential radial expansion due to their different temperature coefficients. Each of piston forms 28 and 29 is then constructed of dissimilar materials. By way of example, the piston form 28 may be of Invar, while the piston form may be of brass.

In operation, it will be apparent that as adjustment screw 17 is rotated, the piston assembly 28 will travel from a centrally adjusted position adjacent electrode band 15 to the right of the band 15, or to the left of band 15. Thus, the capacitance between piston assembly 27 and band 15 will not be changed; the temperature coefficient of capacitance being changed dependent upon which piston is opposite to band 15. Moreover, the temperature coefficient of capacitance of the assembly is acurately controlled in any predetermined manner.

The temperature coefficient of capacitance (TC) is defined as $$TC = \frac{C_2 - C_1}{(T_2 - T_1)C_1} \times 10^{-6}$$

Where $C_2$ is the capacitance of the device at a maximum temperature $T_2$ of the temperature range; and
$C_1$ is the capacitance of the device at the minimum temperature $T_1$ of the temperature range to which the capacitor will be exposed.

The capacitance change $C_2 - C_1$ is due to a change in the dielectric constant of the dielectric cylinder 13 as well as due to dimensional changes of the parts.

The present invention permits a novel range of adjustment of the temperature coefficient of capacitance of the device of FIGURE 1 by suitably selecting materials for the dielectric tube 13 and for the piston forms 28 and 29. Thus, a circuit designer may wish to have a trimmer capacitor having a predetermined variable temperature coefficient characteristic which will compensate for the temperature coefficient characteristic of other components in his circuit.

For illustrative purposes, and when Invar and brass are selected for piston forms 28 and 29, the temperature coefficient of expansion of Invar is $1.6 \times 10^{-6}$ in./in. °C., while the temperature coefficient of brass is $20.5 \times 10^{-6}$ in./in. °C., while glass lies between these values. When the Invar form 28 is adjacent electrode band 15, the temperature coefficient of the device in that adjustment range will be negative in temperature ranges from 25° C. to 125° C. since the glass 13 will expand more than the piston for a given temperature change, whereby the air gap between the glass and the piston will increase so that the capacitance decreases with increasing temperature. Therefore, in this adjustment position, the device will have a negative temperature coefficient. Note that in this region of adjustment of the capacitor, the adjustment range of the capacitor is from the position shown in FIGURE 1 where piston form 28 is adjacent central electrode band 15 with the piston form being moved outwardly.

Moreover, and while still working in this mode of operation, in a temperature range below −55° C., the glass dielectric cylinder 13 will contract more than the piston form 28 so that capacitance will increase as a function of decreasing temperature, whereby a negative temperature coefficient is still exhibited.

Thus, the circuit designer has a first portion of a temperature compensating range available to him when adjusting the capacitor from its central piston position to the right. A further adjustment range is available to the designer, however, where the piston assembly 27 is moved from its central position into the left. In this case, the brass piston form 29 will be located adjacent electrode 15 with adjustment moving this form to the left. In this case, and in a temperature range from, for example, 25° C. to 125° C. the brass will expand more than the glass for a given temperature increase so that the air gap between the piston form 29 and the dielectric 13 will decrease so that capacitance of the device increases as a function of increasing temperature. Accordingly, the temperature coefficient of the device in this range of adjustment and in this temperature range will be positive.

In a low temperature range from 25° C. to −55° C., however, the brass will contract more than the glass for a decrease in temperature, whereby the air gap between the form 29 and glass cylinder 13 increases, thereby decreasing capacitance as temperature increases, whereby the temperature coefficient is still positive.

Clearly, between these two extremes for both pistons, there is a position in which the temperature coefficient will be zero. Moreover, tests have shown that the device can be used as a zero temperature coefficient device with an accuracy in the range of plus or minus 600 parts without using rare materials.

The effect of the above noted change in capacitance as a function of temperature is illustrated in FIGURE 5 where the first line illustrates the capacitance change in a fixed adjustment location for piston form 29, while the second line illustrates the change in capacitance at a fixed adjusted piston position for piston form 28. Clearly, as the piston position is moved, the net resulting influence of capacitance variation due to pistons 28 and 29 will change since the piston closest to electrode band 15 will contribute a greater portion of the capacitance change. Therefore, it will be apparent that the designer now has available to him a means for obtaining a compensation curve close to that which he may require for his other circuitry. Alternatively, he could select a design which would give him a substantially zero compensated device throughout its adjustment range.

In order to obtain an even better control over the temperature coefficient range, it has been found that the adjustment screw 17 should have a thermal expansion coefficient similar to that of glass or of whatever dielectric material is used for the dielectric cylinder 13. In the manner, the axial change in length of screw 17 and dielectric form 13 will substantially match one another so that the axial position of piston assembly 27 will change identically with the position of electrode band 15 and therefore the influence of the axial expansion will be eliminated.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A trimmer capacitor comprising a bushing having an opening therein, a hollow dielectric cylinder secured to said bushing, an adjustment screw means connected to said bushing and extending through said opening in said bushing and into said hollow dielectric cylinder, an electrode band surrounding said dielectric cylinder, and a piston assembly connected to the end of said adjustment screw and movable within said dielectric cylinder; said piston assembly comprising a first and second coaxial piston; each of said first and second pistons comprising thin walled cylinders having a closed end portion; said closed end portions of each of said pistons being adjacent to one another; said adjustment screw extending into said first piston and being connected to central portions of closed end portions of each of said first and second pistons; said first piston being of a material having a first temperature coefficient of expansion; said second piston being of a material having a second and different temperature coefficient of expansion than said material of said first piston.

2. The trimmer capacitor set forth in claim 1 wherein said electrode band is centrally located along the axis of said dielectric cylinder; said first and second pistons being axially movable to either side of said electrode band.

3. The trimmer capacitor substantially as set forth in claim 1 wherein said adjustment screw is of a material having substantially the same temperature coefficient of expansion as said dielectric cylinder.

4. The trimmer capacitor as set forth in claim 1 which includes a fastening means; said fastening means connecting one end of said adjustment screw to said bottom walls of each of said first and second pistons; said adjustment screw being coaxial with said first and second pistons and entering the open end of said first piston and terminating at said bottom wall thereof adjacent said opening in said bottom wall; said fastening means extending from said adjustment screw through said coaxial openings in said pistons and terminating on said bottom wall of said second piston.

5. The device as set forth in claim 4 wherein the bottom of said second piston has a central raised pad portion thereon.

References Cited by the Examiner

UNITED STATES PATENTS 2,989,630 6/1961 Crooker _____ 336—136

FOREIGN PATENTS 102,226 10/1937 Australia.

LEWIS H. MYERS, *Primary Examiner.*

ROBERT K. SCHAEFER, *Examiner.*

E. GOLDBERG, *Assistant Examiner.*